Oct. 14, 1958     C. R. PLATER     2,856,144
FISHING ROD STAND
Filed March 16, 1956
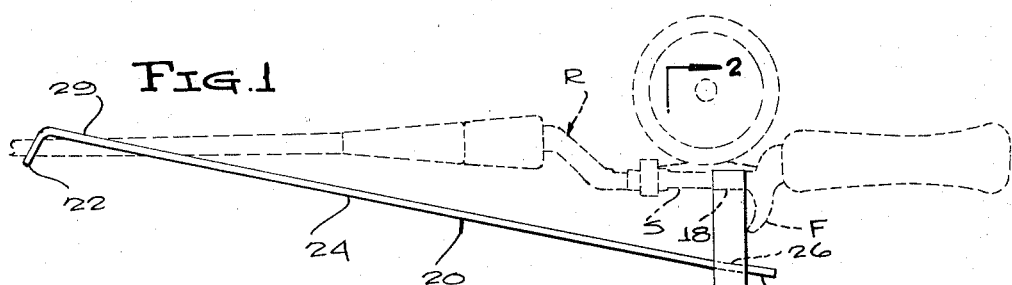
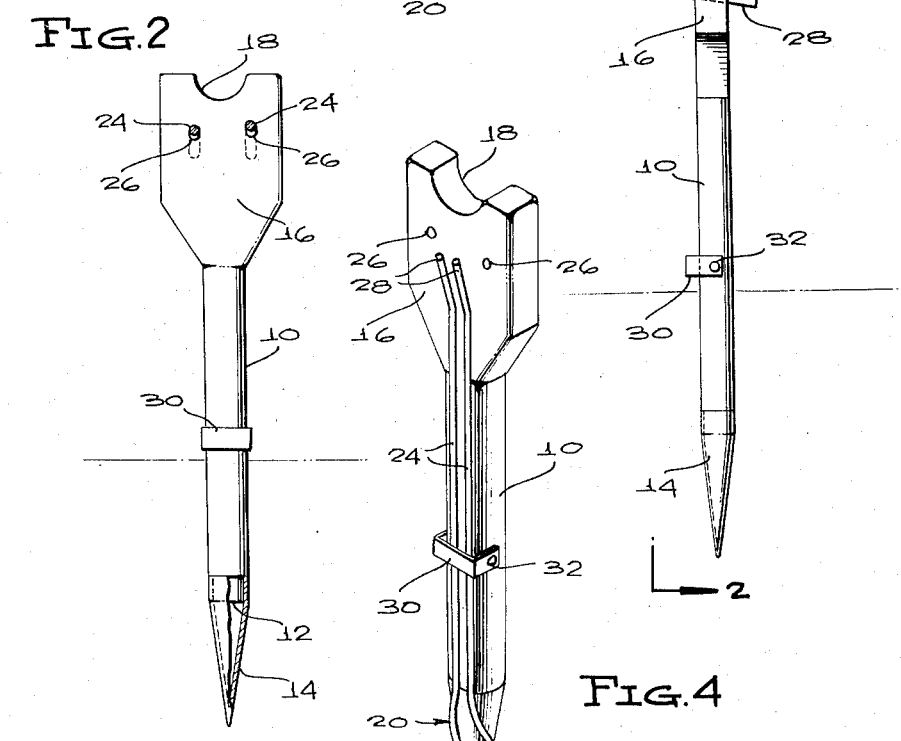
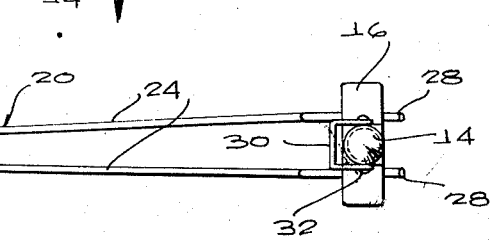
INVENTOR.
CLARENCE R. PLATER
BY
McMorrow, Berman + Davidson
ATTORNEYS

United States Patent Office 2,856,144
Patented Oct. 14, 1958

2,856,144

FISHING ROD STAND

Clarence R. Plater, Youngstown, Ohio

Application March 16, 1956, Serial No. 572,146

1 Claim. (Cl. 248—48)

This invention, a stand or support for a fishing rod, may be briefly summarized as including a standard having at its upper end a rod-receiving cradle, and a support means in the form of a generally U-shaped support arm the bight of which receives the fishing rod at a location spaced longitudinally of the rod from the cradle and the legs of which removably engage in inclined openings of the standard. When the stand is knocked down, a keeper on the standard receives the support arm legs with the support arm in longitudinally contacting relation to the standard, the bight now receiving a ground-penetrating point of the standard in a manner to hold the support arm against the standard, the bight cooperating in this position with the keeper to hold the support arm against the standard.

Important objects of the invention are to provide a stand at low cost that will be fully efficient in supporting a fishing rod in elevated position, where the reel will not be damaged or clogged by dirt entering the same; to facilitate collapsing of the device into a compact, easily carried article; to support the fishing rod in such manner that it will be held against lateral or longitudinal movement when a fish strikes the bait; and to permit removal of the fishing rod from the stand speedily and easily when a strike occurs, so that the fish may be played and brought in by the angler before it has a chance to disengage from the hook.

Other objects will appear from the following description, the claim appended thereto, and from the annexed drawing, in which like reference characters designate like parts throughout the several views, and wherein:

Figure 1 is a side elevation of the device in use, supporting a fishing rod shown in dotted lines;

Figure 2 is a transverse section on line 2—2 of Figure 1;

Figure 3 is a bottom plan view; and

Figure 4 is a perspective view of the stand, knocked down.

A standard 10 is of any desired cross section, and by way of example, is shown as being generally rectangular in cross section with rounded corners. A reduced, cylindrical extension 12 on the lower end of the standard is fixedly engaged in a mating socket of a tapered, metal ground point 14.

At its upper end the standard has a flat, broad head 16 the top surface of which has a recess 18 defining a cradle adapted to receive the reel seat S of a fishing rod R with a depending finger F of the seat S abutting against the rear face of the head to hold the rod against moving longitudinally under the pull of a hooked fish.

A support arm 20 formed of a single length of rigid rod material, is generally of a U-shape, including a bight 22 and elongated straight legs 24. Head 16 has transversely aligned openings 26 extending therethrough at a slight inclination from the horizontal to receive extensions 28 formed on the free ends of the legs. The extensions, as shown in Figures 1 and 4 are oblique, to a slight extent, to the lengths of the legs.

Since the openings are spaced downwardly from the cradle a substantial distance, the support arm is inclined to support the fishing rod in a position extending forwardly from the standard, so that the line can extend into the water with the bait ready to be taken by a fish.

Bight 22 (see Figures 1 and 3) is in the form of an upwardly opening ring lying in a plane disposed at an obtuse angle to the lengths of the legs. As a result the sides of the bight will hold the rod against substantial lateral deviation, in cooperation with the forward end portions 29 of the legs, which also extend along opposite sides of rod R as abutments limiting lateral deviation. To reduce the lateral movement of the rod R to a minimum, the legs 24 converge toward the bight or rod rest 22 (see Figure 3) and are closely spaced at the end portions 29.

A U-shaped keeper 30 straddles the standard intermediate the ends of the standard and is connected to the standard by pins 32. The keeper, when the device is in use, provides a support for a pincers or other piece of fishing gear, not shown.

When the device is to be knocked down, the legs 24 are withdrawn from the openings 26 and are inserted upwardly through the keeper as shown in Figure 4. The annular rod rest 22 will now be disposed to receive the point 14, due to its mentioned disposition in a plane oblique to the lengths of legs 24. A compact, readily stored and easily transportable article thus is provided, having no lateral projections of large size.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

In a knockdown stand, an assemblage of members separably connected for storage, comprising: a standard straight from end to end thereof and having a pointed end; a loop-like keeper secured to and projecting laterally from the standard intermediate the ends of the standard; an elongated, U-shaped arm of wire material comprising a bight, a pair of coplanar legs extending from the bight, and longitudinal extensions formed upon the ends of the legs remote from the bight and lying in a common plane oblique to that of the legs, said bight being in the form of an open ring lying in a plane disposed at an obtuse angle to the lengths of the legs, the bight being disposed wholly at one side of the plane of the legs and receiving said pointed end, the legs extending in longitudinally contacting relation to the standard at one side of the standard through the keeper, said extensions lying wholly at the opposite side of said plane of the arms and projecting outwardly from the standard, the ring abutting the pointed end to limit the arm against movement longitudinally of the standard in one direction, the keeper being disposed in the path of the outwardly projecting extension on movement of the arm longitudinally of the standard in the opposite direction, to thereby engage the extensions and arrest said movement of the arm in said opposite direction.

References Cited in the file of this patent

UNITED STATES PATENTS

| | | |
|---|---|---|
| 314,751 | Taylor | Mar. 31, 1885 |
| 1,040,645 | Davis | Oct. 8, 1912 |
| 1,703,554 | Slauter et al. | Feb. 26, 1929 |
| 2,592,688 | Halfpap et al. | Apr. 15, 1952 |
| 2,752,115 | Green | June 26, 1956 |

FOREIGN PATENTS

| | | |
|---|---|---|
| 15,991 | Great Britain | June 23, 1894 |